(12) United States Patent
Hale et al.

(10) Patent No.: US 10,974,846 B2
(45) Date of Patent: Apr. 13, 2021

(54) FIXED END ELECTRONIC DETECTION OF SECONDARY LOAD PATH ENGAGEMENT OF AIRCRAFT FLIGHT CONTROL ACTUATOR

(71) Applicant: Parker-Hannifin Corporation, Cleveland, OH (US)

(72) Inventors: Brian Curtis Hale, Syracuse, UT (US); Abbas M. Charafeddine, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 797 days.

(21) Appl. No.: 15/834,426

(22) Filed: Dec. 7, 2017

(65) Prior Publication Data

US 2018/0162550 A1 Jun. 14, 2018

Related U.S. Application Data

(60) Provisional application No. 62/431,871, filed on Dec. 9, 2016.

(51) Int. Cl.

| | |
|---|---|
| *B64D 45/00* | (2006.01) |
| *B64C 5/10* | (2006.01) |
| *F16H 25/20* | (2006.01) |
| *B64C 13/28* | (2006.01) |
| *B64C 5/02* | (2006.01) |
| *F16H 25/22* | (2006.01) |

(52) U.S. Cl.
CPC ............ *B64D 45/0005* (2013.01); *B64C 5/02* (2013.01); *B64C 5/10* (2013.01); *B64C 13/341* (2018.01); *B64D 45/00* (2013.01); *F16H 25/205* (2013.01); *B64D 2045/0085* (2013.01); *F16H 25/2204* (2013.01)

(58) Field of Classification Search
CPC ... B64C 13/341; B64C 13/503; B64C 13/505; F16H 25/205; B64D 45/0005
See application file for complete search history.

(56) References Cited

U.S. PATENT DOCUMENTS

| | | | |
|---|---|---|---|
| 6,851,648 B2 * | 2/2005 | Perni | F16H 25/205 244/99.3 |
| 6,927,513 B2 * | 8/2005 | Schreier | F16H 25/20 310/12.01 |

(Continued)

FOREIGN PATENT DOCUMENTS

WO 2010076635 7/2010

*Primary Examiner* — Philip J Bonzell
*Assistant Examiner* — Michael B. Kreiner
(74) *Attorney, Agent, or Firm* — Renner, Otto, Boisselle & Sklar, LLP

(57) ABSTRACT

A detection system for detecting failure in a primary load path of a flight control actuator and annunciating engagement in a secondary load path of the flight control actuator. The failure in the primary load path causes axial movement in a secondary rod of the secondary load path. The detection system includes a secondary mounting assembly that guides axial movement of the secondary rod; and a sensor that electronically detects relative axial displacement between the secondary rod and the secondary mounting assembly upon a primary load path failure and annunciates transition to engagement in the secondary load path.

16 Claims, 6 Drawing Sheets

(56) References Cited

U.S. PATENT DOCUMENTS

| | | | | |
|---|---|---|---|---|
| 6,928,895 | B2 * | 8/2005 | Davies | B64C 9/02 49/139 |
| 7,866,602 | B2 * | 1/2011 | Port-Robach | F16H 25/2021 244/99.4 |
| 7,883,054 | B2 * | 2/2011 | Elliott | B64C 25/30 244/99.9 |
| 7,946,529 | B2 * | 5/2011 | Moalic | B64C 13/341 244/99.4 |
| 8,033,500 | B1 * | 10/2011 | Charafeddine | B64C 13/42 244/75.1 |
| 8,191,824 | B2 * | 6/2012 | Shaheen | G01L 1/2225 244/76 A |
| 8,291,782 | B1 * | 10/2012 | Shaheen | B64C 9/02 74/89.26 |
| 8,496,204 | B1 * | 7/2013 | Charafeddine | F16H 25/205 244/99.4 |
| 8,702,034 | B2 * | 4/2014 | Moulon | B64F 5/60 244/99.2 |
| 8,714,479 | B1 * | 5/2014 | Chapman | B64C 13/341 244/99.3 |
| 8,944,372 | B2 * | 2/2015 | Moulon | B64C 13/341 244/99.4 |
| 8,960,031 | B2 * | 2/2015 | Keech | F16H 25/205 74/89.26 |
| 8,985,510 | B2 * | 3/2015 | Hale | B64C 13/341 244/99.9 |
| 9,933,058 | B1 * | 4/2018 | Muster | F16H 25/2015 |
| 10,040,539 | B2 * | 8/2018 | Antunes | F16H 25/205 |
| 10,065,728 | B2 * | 9/2018 | Cyrot | B64C 13/506 |
| 10,066,715 | B2 * | 9/2018 | Larson | F16H 25/2015 |
| 10,132,724 | B2 * | 11/2018 | Moulon | B64C 13/30 |
| 10,155,582 | B2 * | 12/2018 | Medina | B64C 13/341 |
| 10,239,603 | B2 * | 3/2019 | Medina | B64C 9/02 |
| 10,337,593 | B2 * | 7/2019 | Medina | B64C 5/10 |
| 10,527,142 | B2 * | 1/2020 | Nguyen | B64C 13/36 |
| 10,626,965 | B2 * | 4/2020 | Vermande | F16H 25/2015 |
| 10,787,279 | B2 * | 9/2020 | Moulon | B64F 5/60 |
| 10,822,074 | B2 * | 11/2020 | Edwards | B64C 13/28 |
| 10,871,214 | B2 * | 12/2020 | Teyssier | B64C 13/341 |
| 2008/0203223 | A1 * | 8/2008 | Cyrot | F16H 25/205 244/99.3 |
| 2013/0313358 | A1 | 11/2013 | Hale | |
| 2016/0025199 | A1 * | 1/2016 | Boone | B64C 13/50 74/89.38 |
| 2018/0045291 | A1 * | 2/2018 | Teyssier | B64C 13/28 |
| 2018/0194454 | A1 * | 7/2018 | Olson | B64C 5/02 |

* cited by examiner

FIXED END ELECTRONIC DETECTION OF SECONDARY LOAD PATH ENGAGEMENT OF AIRCRAFT FLIGHT CONTROL ACTUATOR

FIELD OF INVENTION

The present invention relates generally to aircraft flight control actuators, and more particularly to aircraft flight control actuators having assemblies for detecting failure of one or more portions of the aircraft flight control actuator.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw and roll axes, and the secondary flight control surfaces are those that are used to influence the lift or drag (or both) of the aircraft. Although some aircraft may include additional control surfaces, the primary flight control surfaces typically include a pair of elevators, a pair of ailerons and a rudder, and the secondary flight control surfaces typically include a horizontal stabilizer, a plurality of flaps, slats and spoilers.

Modern aircraft have horizontal stabilizers located at the tail section of the fuselage or the rudder section that are pivotally supported relative to the airplane fuselage to "trim" the aircraft during flight by selective adjustment by the operator or pilot from an internal control unit. This involves adjusting the position of the horizontal stabilizer by a stabilizer actuator to accommodate different load distributions within the aircraft and different atmospheric conditions, i.e. wind, rain, snow, etc. In this regard the stabilizer is traditionally pivotally connected to the tail section of the fuselage at a point generally midway along its length.

One common trimmable horizontal stabilizer actuator consists of a primary ball nut assembly connected with an actuating drive gimbal which is pivotally connected to one end of the horizontal stabilizer structure. The primary ball nut assembly includes a primary ball nut and a rotatable ball screw extending axially and usually vertically through the primary ball nut and a drive gimbal. The primary ball nut is connected to the drive gimbal by a trunnion segment. The ball screw, in turn, may have its upper end remote from the actuating drive gimbal and may be fixed from translation or axial movement by a connection to a second, support gimbal which is pivotally secured to the tail section.

As the ball screw is rotated, the drive gimbal and primary ball nut will be moved in translation. Thus, as the ball screw is rotated in one direction, the primary ball nut is moved towards the ball screw distal end and the leading edge of the horizontal stabilizer is pivoted upward in a first direction. On the other hand, by rotating the ball screw in an opposite direction, the primary ball nut is moved toward the ball screw proximal end and the leading edge of the horizontal stabilizer is pivoted downward in a second direction. Rotation of the ball screw is routinely effected by a motor and associated gearing which is actuated by the pilot via the internal control unit.

The horizontal stabilizer movement, as controlled by the operator, is transmitted by the ball screw through the actuating drive gimbal by way of the primary ball nut assembly which defines a primary load path. The movement has a load with tensile and compressive components as well as a torque component due to the ball screw thread lead. Failures of the primary load path, such as caused by the shearing off of the connecting trunnion segment or by the loss of nut ball members from the ball nut assembly, can result in the partial or complete loss of control of the horizontal stabilizer. For this reason, stabilizer actuators are often provided with a secondary load path as a protection against such catastrophic failure of the primary path.

SUMMARY OF INVENTION

The present invention is directed to a detection system for detecting failure in a primary load path of a flight control actuator and annunciating transition to engagement in a secondary load path of the flight control actuator. The failure in the primary load path causes axial movement in a secondary rod of the secondary load path. The detection system includes a secondary mounting assembly that guides axial movement of the secondary rod; and a sensor that electronically detects relative axial displacement between the secondary rod and the secondary mounting assembly upon a primary load path failure and annunciates transition to engagement in the secondary load path.

Embodiments of the invention may include one or more of the following additional features separately or in combination.

The sensor may be a bi-directional sensor that upon a primary load path failure electronically detects either a tensile load in the secondary rod at a first axial end of the secondary mounting assembly or a compressive load in the secondary rod at a second end of the secondary mounting assembly, and annunciates transition to engagement in the secondary load path.

The detection system may further include a spherical joint that couples the secondary rod to the secondary mounting assembly to allow articulation of the secondary rod relative to the secondary mounting assembly.

The spherical joint may include a spherical race that is slidable axially with the secondary rod in an axially extending cavity defined by the secondary mounting assembly.

The spherical race and the secondary mounting assembly may be axially keyed to prevent rotation of the spherical race within the cavity of the secondary mounting assembly.

The detection system may further include a wall and a retainer at axially opposite ends of the cavity that restrict the amount of axial movement of the spherical race within the cavity.

The spherical race may include a compression indicating target, a neutral target, and a tension indicating target that move with the spherical race and that are detectable by the sensor to indicate respective axial positions of the spherical race relative to the secondary mounting assembly.

Upon primary load path failure, the secondary rod along with the secondary race may translate axially until the spherical race bottoms on the wall to thereby engage the secondary rod in compression. The sensor may detect the compression indicating target to annunciate that the primary load path has failed and transition to engagement in the secondary load path.

Upon primary load path failure, the secondary rod along with the secondary race may translate axially until the spherical race bottoms on the retainer to thereby engage the secondary rod in tension. The sensor may detect the tension indicating target to annunciate that the primary load path has failed and transition to engagement in the secondary load path.

The spherical race may include one or more targets that move with the spherical race and that are detectable by the sensor to indicate respective axial positions of the spherical race relative to the secondary mounting assembly.

The targets may include a first target that the sensor detects as the spherical race being in a neutral position relative to the secondary mounting assembly to indicate that primary load path is intact.

The targets may include second and third targets, the second target of which the sensor detects the spherical race as being displaced relative to the secondary mounting assembly in a second direction to annunciate the primary load path has failed and transition to engagement in the secondary load path, and the third target of which the sensor detects the spherical race as being displaced relative to the secondary mounting assembly in a third direction to annunciate the primary load path has failed and transition to engagement in the secondary load path, the third direction being opposite that of the second direction.

The second target may indicate a secondary load path engagement in which the secondary rod is loaded in compression and the third target indicates a secondary load path engagement in which the secondary rod is loaded in tension.

The retainer may be axially adjustable to increase or decrease the axial span of the cavity to allow for respectively greater or less axial movement of the spherical race within the cavity.

The sensor may be configured to annunciate engagement in the secondary load path before the secondary rod is loaded in tension or compression.

According to another aspect of the invention, a flight control actuator includes a primary load path; a secondary load path including a secondary rod, wherein failure in the primary load path causes axial movement in the secondary rod of the secondary load path; a secondary mounting assembly defining an axially extending cavity therein; and a spherical joint that couples the secondary rod to the secondary mounting assembly, the spherical joint including a spherical race that is slidable axially within the cavity to allow axial movement of the secondary rod under primary load path operation without loading the secondary rod and to allow axial movement of the secondary rod during primary load path failure.

According to another aspect of the invention, a flight control actuator includes a primary load path; a secondary load path including a secondary rod, wherein failure in the primary load path causes axial movement in the secondary rod of the secondary load path; and a detection system including: a secondary mounting assembly that guides axial movement of the secondary rod; and a sensor that electronically detects relative axial displacement between the secondary rod and the secondary mounting assembly upon a primary load path failure and annunciates transition to engagement in the secondary load path.

Embodiments of the invention may include one or more of the following additional features separately or in combination.

The flight control actuator may further include first, second, and third targets that move axially with axial movement of the secondary rod relative to the secondary mounting assembly and that are detectable by the sensor to indicate respective neutral, compressive, and tensile axial positions of the secondary rod.

The secondary mounting assembly may be mounted to an aircraft structure by fasteners. When the primary load path is intact and the fasteners are removed, the secondary mounting assembly is slidable axially relative to the secondary rod.

When the secondary rod is in the neutral axial position the first target may overlap with the sensor to allow for verification of detection of the first target by the sensor.

The secondary mounting assembly may be slidable axially relative to the secondary rod in a direction toward a base of the aircraft structure to overlap the second target with the sensor to allow for verification of detection of the second target by the sensor.

The secondary mounting assembly may be slidable axially relative to the secondary rod in a direction away from a base of the aircraft structure to overlap the third target with the sensor to allow for verification of detection of the third target by the sensor.

DETAILED DESCRIPTION

The principles of the present invention have particular application to flight control actuators for controlling a flight control surface of a vehicle, such as a stabilizer of an aircraft. The principles are also applicable to other actuators including linear and rotary actuators where there is a need to resist moving the actuator in forward and reverse directions caused by vibrational forces. The forward and reverse directions may be linear directions in the case of a linear actuator or rotational directions in the case of a rotary actuator.

Figure 1:
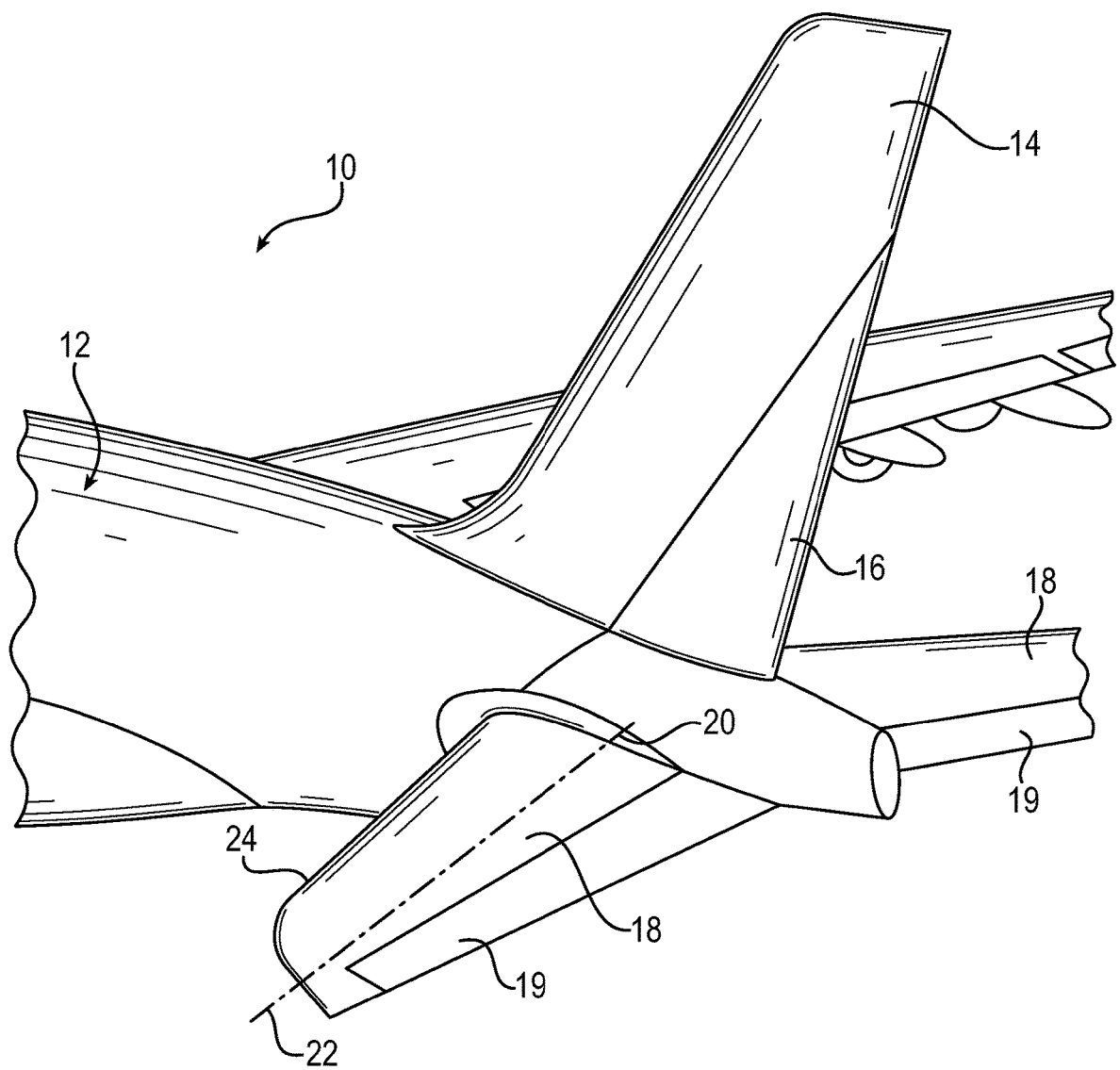
FIG. 1 is an elevational view of an aircraft including an actuator according to the present invention.

Referring first to FIG. 1, an exemplary aircraft 10 includes a rear fuselage 12 having a tail fin 14 which carries a rudder 16. Horizontal stabilizers 18 and elevators 19 are provided on either side of the tail fin 14. Each horizontal stabilizer 18 is pivotably mounted to the fuselage 12 at pivot point 20 whereby it can be pivoted about axis 22 to adjust the longitudinal pitch (i.e., "trim") of the aircraft 10. During flight, each horizontal stabilizer 18 is adjusted by a horizontal stabilizer trim actuator (also herein referred to as an HSTA) which moves the stabilizer's leading edge 24 upward (first direction, aircraft nose down) and downward (second direction, aircraft nose up) relative to the axis 22. The stabilizer adjustments may be automatically controlled directly from the aircraft's flight computers (for example, an automatic flight control unit, or any automatic control unit in other applications) and/or may be manually controlled by pilot input.

Figure 2:
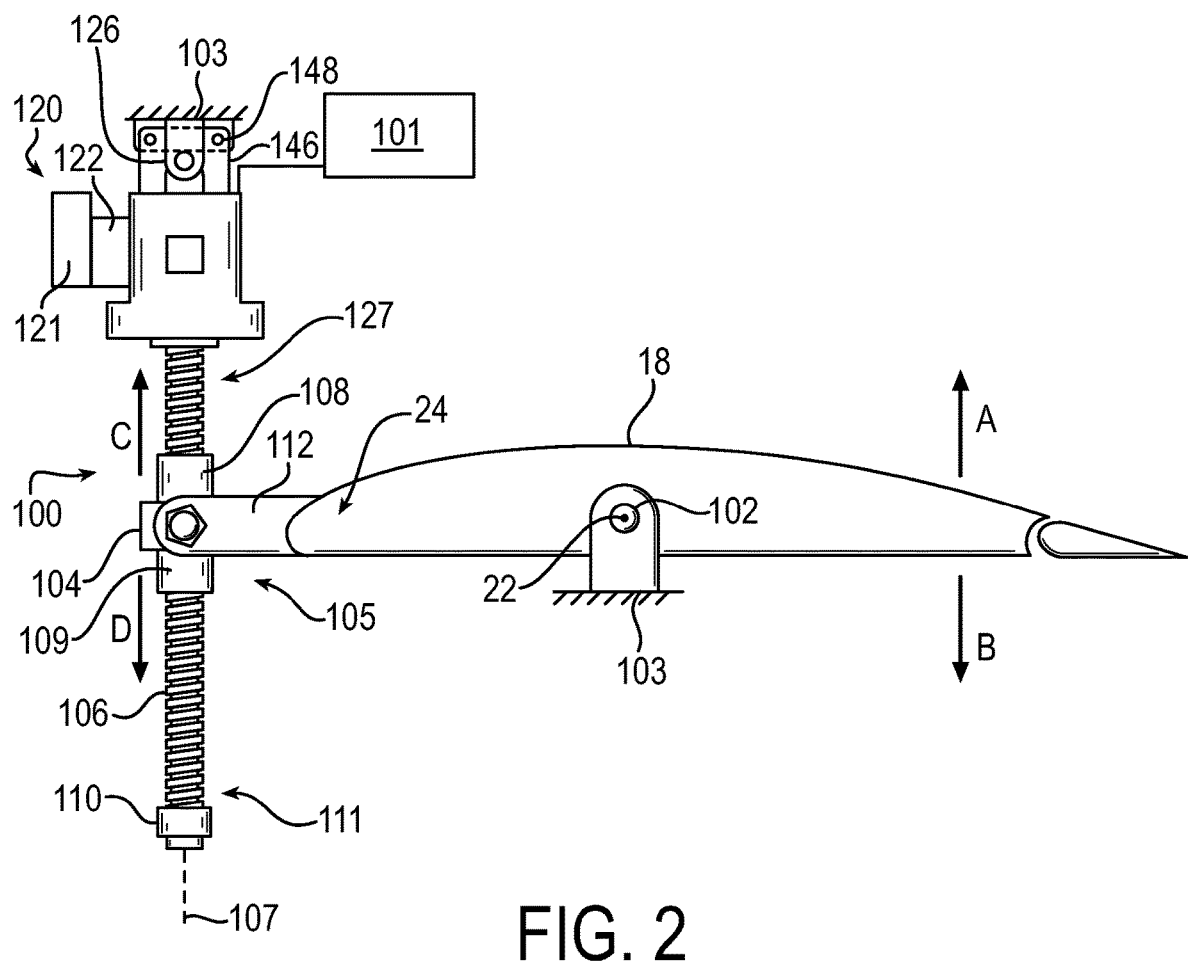
FIG. 2 is a schematic view of an actuator according to the present invention, for moving a control surface of the aircraft of FIG. 1.

Turning now to FIG. 2, an exemplary horizontal stabilizer trim actuator (HSTA) 100 according to the present invention is shown for selectively controlling the position of the horizontal stabilizer 18 (or a control surface, more generally). The actuator 100 is configured to actuate the horizontal stabilizer, for example in response to a command from a controller 101 to move the flight control surface 18. For example, the flight control surface 18 is rotatable about the pivot axis 22, in an upward first direction A or a downward second direction B. It will be appreciated that apparatuses such as an internal control unit 101 are generally well known in the art and thus known details thereof have been omitted for purposes of brevity and simplicity.

The horizontal stabilizer 18 may be pivotably connected along its length to a pivoting stabilizer gimbal structure 102, also herein referred to as a stabilizer gimbal 102. The stabilizer gimbal 102 is attached to the vertical stabilizer section or fuselage tail section 103 of the fuselage 12. The forward end 24 of the horizontal stabilizer 18 may be in turn pivotably connected to an actuating drive gimbal 104 located generally midway along the actuator 100 and which in turn is pivotably connected to a rotating assembly of the actuator 100, such as a nut and screw assembly 105.

The depicted actuator 100 is shown as a linear actuator that is driven to effect movement of the stabilizer (or a driven component in other applications) along a longitudinal axis. The actuator 100 includes a moving end that moves to control movement of the stabilizer 18 and a fixed end opposite the moving end. The fixed end is coupled to a reference structure of the aircraft (such as a fuselage portion) via a support gimbal 126. The moving end of the actuator 100 includes a rotating assembly, such as the nut and screw assembly 105, connected to the horizontal stabilizer 18 for controlling movement of the stabilizer 18 via the drive gimbal 104. The nut and screw assembly 105 is driven by a drive unit 120 disposed at the fixed end of the actuator 100.

The drive unit 120 may include, for example, a hydraulic or electric drive motor 121 and a gearbox assembly 122. The drive unit 120 is provided for rotatingly driving the rotating assembly/nut and screw assembly 105, to effect movement of a driven component of the nut and screw assembly 105.

The drive motor 121 for the actuator 100 described herein need not be an electric motor. The drive unit 120 could additionally or alternatively comprise hydraulic and/or pneumatic cylinders, or any other device which can effect movement of the actuatable surface 18. The drive unit 120 and further details thereof are of a construction well known in the art and thus it is only generally shown and described for purposes of simplicity and brevity.

The depicted drive motor 121 drives the nut and screw assembly 105, which includes a first driven component 106 that is driven by the motor 121 to effect movement of a second driven component 108. More particularly, the first driven component 106 of the depicted nut and screw assembly 105 is a ball screw 106. The second driven component 108 of the depicted nut and screw assembly 105 is a ball nut assembly 108 for translating along the ball screw 106. The translation of the ball nut assembly 108 is along a longitudinal axis 107. The translation is effected by rotation of the ball screw 106 about the same axis 107. Thus, the ball screw 106 is driven by the motor 121 to effect linear translation of the ball nut assembly 108 along the longitudinal axis 107.

The ball nut assembly 108 is coupled to the drive gimbal 104 and is located generally midway along the screw 106. An extend mechanical stop 110 may be attached to a distal end 111 of the ball screw 106 to assure that the ball nut assembly 108 will not be unthreaded from the ball screw 106.

The ball nut assembly 108 is a primary ball nut assembly 108 that with a primary portion of the drive gimbal 104, forms a primary load path allowing a transfer of force from the drive unit 120, through the primary load path to the actuatable surface 18. A secondary nut assembly 109 is also coupled to the ball screw 106, and along with a secondary portion of the drive gimbal 104, forms a secondary load path allowing a transfer of force from the drive unit 120, through the secondary load path, or vice versa, in the case of failure of the primary load path. The secondary load path is not loaded during normal functioning of the primary load path. In the case of a failure of the primary load path, a change of the secondary load path is effected, causing loading of the secondary load path.

It will be appreciated that the principles of the invention are also applicable to an actuator having a screw assembly including a drive screw or lead screw or having a translating screw and a rotating nut. For example, the first driven component driven by a motor may be a ball nut assembly. Such ball nut assembly may be rotated by the motor to effect translation of a screw. The screw may be a second driven component, translationally driven along a respective longitudinal axis about which the ball nut assembly is rotated by the motor. Further, the principles of the invention are equally applicable to other types of screws, such as lead screws or roller screws, for example. Also, the principles apply to other suitable types of linear actuators and to rotary actuators.

The illustrated actuator 100 is configured to extend and retract thereby moving a force transfer member 112, secured to the drive gimbal 104. The force transfer member 112 couples a suitable location of the actuator 100, such as the primary ball nut assembly 108, to a suitable location of the respective stabilizer 18. The primary ball nut assembly 108 and force transfer member 112 are movable in an upward third direction C (corresponding to movement of the stabilizer 18 in the downward second direction B) and an opposite downward fourth direction D (corresponding to movement of the stabilizer 18 in the upward first direction A).

It will be appreciated that in a case of failure of the primary load path, such as caused by the shearing off of a connecting trunnion segment of the primary portion of the drive gimbal 104, or by the loss of nut ball members from the primary ball nut assembly 108, the force transfer member 112 may be controlled via the secondary portion of the drive gimbal 104 and the secondary load path. Accordingly, where a state change of the secondary load path is effected causing the secondary load path to be loaded, subsequent to failure of the primary load path, the secondary nut assembly 109 will allow for transfer of force from the ball screw 106. Force will transfer from the secondary nut assembly 109, to the secondary portion of the drive gimbal 104, and through the force transfer member 112 to the actuatable surface 18 or vice versa.

As used herein, the upward and downward directions refer to one alignment of the HSTA 100 in the fuselage of an aircraft, where in level flight or landed on a ground surface, an HSTA is often aligned vertically with respect to the ground surface. Thus, a downward/distal end of the HSTA is located nearer the ground than the opposite upward/proximal end of the HSTA. In other words, in such orientation, upward is meant to refer to a direction towards a proximal end 127 of the screw 106 adjacent the drive unit 120, and downward is meant to refer to a direction towards the distal end 111 of the screw 106 opposite the drive unit 120. The terms are not meant to be limiting, but refer to opposing directions along the longitudinal axis 107, which could be otherwise aligned relative to the ground, fuselage, or control/actuatable surface 18. Also as used herein, coupling may include direct or indirect coupling.

Figure 3:
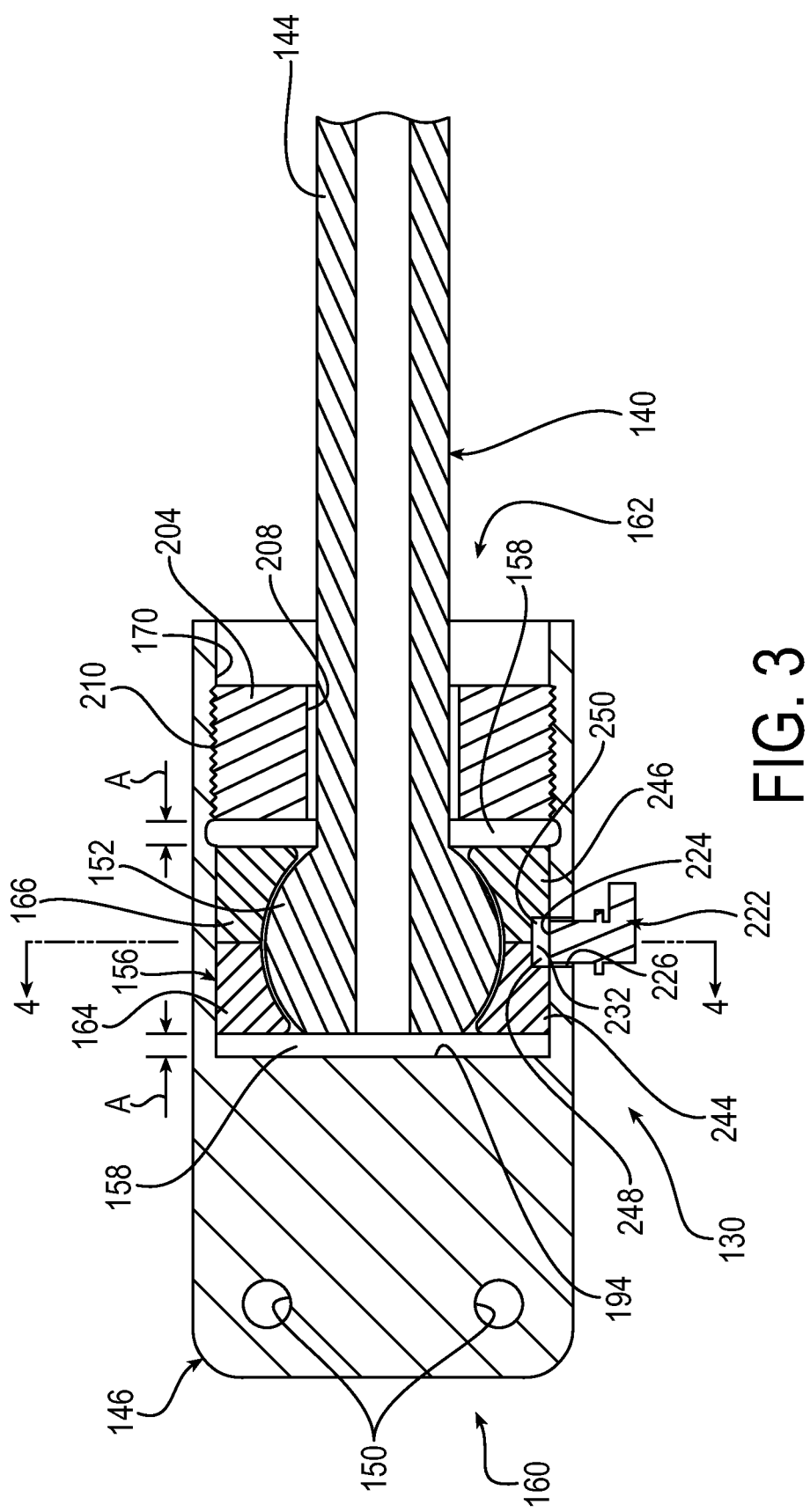
FIG. 3 is a partial elevational schematic view of the actuator as shown in FIG. 2, broken away in section, and shown with the fixed end of the actuator in a default state.

The secondary load path of the actuator 100 may also include a secondary rod 140 and a secondary mounting assembly 146, exemplarily shown in FIGS. 2 and 3. In FIGS. 2 and 3, the secondary rod 140 is illustrated as a tie rod 140 and the secondary mounting assembly 146 is illustrated as a clevis assembly 146, and for purposes of convenience the terms tie rod 140 and secondary clevis assembly 146 will be used hereafter. It will be appreciated, of course, that the secondary rod 140 may take on other forms such as a spoke, brace, beam, and/or other suitable load carrying member. Likewise, the secondary mounting assembly 146 may take on other forms such as a fixed bracket, pivot bracket, shackle, gimbal, and/or other suitable aircraft structure mounting assembly.

A secondary load path engagement in the tie rod 140 may be triggered upon a primary load path failure in numerous different ways, whether at the fixed end or the moving end of the actuator 100. For example, in the FIG. 2 illustration the tie rod 140 may extend downward from the secondary clevis assembly 146 through a central hollow of the ball screw 106 and be connected to the ball screw 106 at its distal end 111 such that a primary load path failure results in downward pull or upward push on the tie rod 140 depending on load conditions at the time of failure. The primary load path failure may include, for example, a fracture in the ball screw 106, or axial movement in the ball screw 106 due to backlash from a primary load path moving end failure. The tie rod 140 and ball screw 106 may also have mating splines along one or more axial portions thereof to enable the tie rod 140 and ball screw 106 to rotate together for example during primary load path operation, while also allowing the tie rod 140 to move axially relative to the ball screw 106 under certain primary load path failures. As will be appreciated, numerous primary load path failures involving any one or more primary load path component(s) such as the ball screw 106, the primary ball nut assembly 108, the primary portion of the drive gimbal 104, the drive unit 120, and/or the support gimbal 126, may trigger a secondary load path engagement in the tie rod 140.

A pair of mounting bolts 148 are mounted through mounting openings 150 in the secondary clevis assembly 146 and corresponding openings in the aircraft structure 103 to connect the secondary clevis assembly 146 to the aircraft structure 103 at the fixed end (the upper end in FIG. 2) of the actuator 100. The secondary clevis assembly 146, in turn, couples the tie rod 140 to the aircraft structure 103 as part of the secondary load path. The tie rod 140 is configured to move axially within the secondary clevis assembly 146 for example along the longitudinal axis 107 (FIG. 2) in response to a primary load path failure. As will be appreciated, in the event of a failure of the primary load path, for example by a fracture in the ball screw 106 or a sudden backlash in the ball screw 106 caused by a failure in another primary load path component, the secondary load path will engage, for example by taking the load through the secondary clevis assembly 146 and the tie rod 140. Thus, force will transfer from the control surface 18 to the aircraft structure 103, or vice versa, via the secondary clevis assembly 146 and the tie rod 140.

Figure 4:
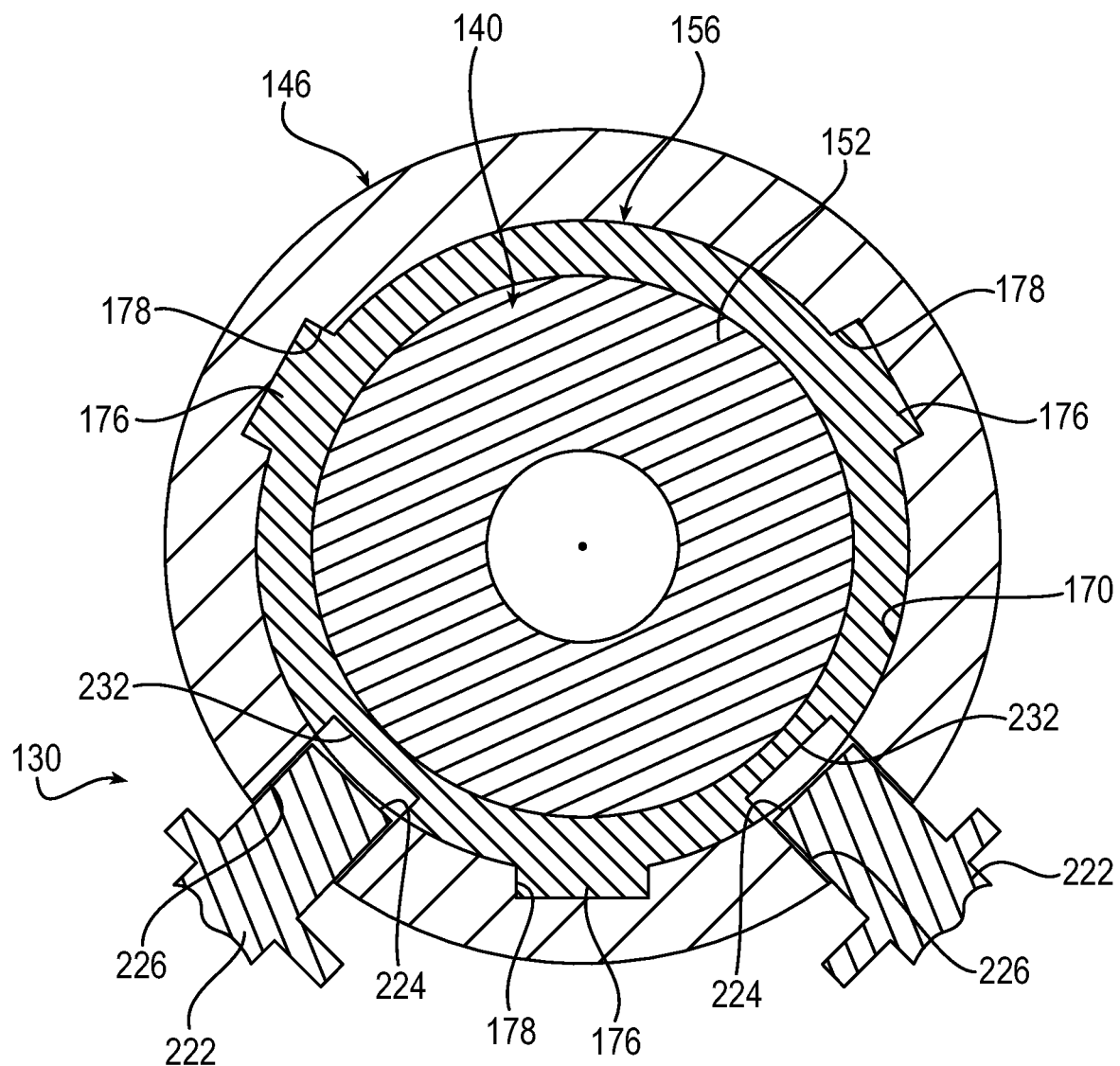
FIG. 4 is a cross-sectional view through line 4-4 of FIG. 3.

Reference is now made to FIGS. 3 and 4, which show further details of the secondary clevis assembly 146 and a detection system 130 for detecting failure of the actuator 100. As shown in FIG. 3, the tie rod 140 is made up of an elongated rod portion 144 that terminates at a spherical shape head 152. The spherical head 152 is fitted within a spherical race 156 that is centered axially within a cavity 158 of the secondary clevis assembly 146. For purposes of reference herein, the left side of the secondary clevis assembly 146 as shown in FIG. 3 is referred to as a compression side 160 and the right side is referred to as a tension side 162. The compression side 160 and tension side 162 are at opposite axial ends of the cavity 158 and, as described in greater detail below, correspond to an engagement state and position of the tie rod 140 as the secondary load path reacts an externally applied load triggered by a primary load path failure.

The spherical head 152 and spherical race 156 cooperate to form a spherical joint that enables articulation of the tie rod 140 relative to the secondary clevis assembly 146 during normal operation, that is, during primary load path operation. In the illustrated embodiment, the spherical race 156 includes a compression side race 164 and a tension side race 166 on axially opposite sides of the spherical head 152, with the elongated rod portion 144 of the tie rod 140 projecting through an opening 168 in the tension side race 166. The compression side race 164 and tension side race 166 can be secured together by fasteners or other suitable connecting means. As will be appreciated, the spherical joint can include a spherical ball bearing, a spherical ball bushing, or any other suitable bearing structure. The spherical head 152 can be integral with the elongated rod portion 144 or be a separate component attached thereto.

The spherical race 156 is mounted for relative axial sliding movement within a portion of a bore 170 of the secondary clevis assembly 146 corresponding to the location of the cavity 158. Thus, axial movement of the spherical head 152 of the tie rod 140 translates into an axial force at the spherical joint which, in turn, translates the force into axial movement of the spherical race 156 relative to the bore 170 of the secondary clevis assembly 146. The axial movement capability of the spherical joint (the spherical race 156 and spherical head 152) enables the tie rod 140 to move sufficiently under primary load path deflections and other thermal expansions/contractions without loading the tie rod 140. As shown in FIG. 4, to aid such axial sliding movement of the spherical race 156, the compression side race 164 and the tension side race 166 have axially extending tabs 176 projecting from their outer diameters that are slidably received within axially extending key grooves 178 in the bore 170 of the secondary clevis assembly 146. The tabs 176 extend the axial length of the spherical race 156, and the key grooves 178 extend the axial length of the cavity 158. The key grooves 178 guide the tabs 176 and thus the spherical race 156 axially back and forth (in FIG. 3) in the cavity 158. The tabs 176 of the spherical race 156 also serve an anti-rotation function to prevent rotation of the spherical race 156 within the bore 170 of the secondary clevis assembly 146. The illustrated embodiment has three equally circumferentially spaced tabs 176 and key grooves 178, and the tabs 176 and key grooves 178 have a rectangular shape in cross section. Of course, other configurations are contemplated, as will be appreciated. For example, the tabs 176 may project inwardly from the bore 170 of the secondary clevis assembly 146 and the key grooves 178 may be provided in the outer diameter of the spherical race 156. Further, the tabs 176 and key grooves 178 may number from one to any suitable plurality and may be unequally spaced and non-rectangular in cross section.

As shown in FIG. 3, the secondary clevis assembly 146 traps the spherical head 152 and spherical race 156 in the cavity 158 by means of a wall 194 at the compression side 160 and a retainer 204 at the tension side 162. The wall 194 can form an integral part of the housing structure of the secondary clevis assembly 146, as shown, or can be connected as a separate part to the secondary clevis assembly 146. The retainer 204 has a central opening 208 through which the elongated rod portion 144 of the tie rod 140 extends. The retainer 204 can be mounted by a threaded engagement 210 with respect to the bore 170 of the secondary clevis assembly 146 and secured in place by a suitable locking member, for example by a not-shown dowel pin and a retaining ring to trap the dowel pin. The wall 194 and retainer 204 operate as boundaries to retain the spherical head 152 and spherical race 156 within the opposite axial ends of the cavity 158. The threaded engagement 210 enables the retainer 204 to be adjusted (to the right or left in FIG. 3) to increase or decrease the axial span of the cavity 158 and, accordingly, allow for respectively greater or less axial movement of the spherical race 156 and spherical head 152 within the cavity 158. Additionally and/or alternatively, a set of locking keys can be implemented into the key grooves 178 in the compression and/or tension directions to nest inside the secondary clevis assembly 146 to reduce axial movement of the spherical race 156 and spherical head 152 within the cavity 158. A rotary seal can be used at the inner diameter of the central opening 208 of the retainer 204 to seal against the tie rod 140 to prevent moisture and contamination from entering the spherical joint area. This improves the reliability and robustness of the actuator 100.

Still referring to FIG. 3, it will be appreciated that in the event of a primary load path failure and engagement of the secondary load path, the tie rod 140 may be loaded either in compression or tension. Thus, in the case where the primary load path failure urges the tie rod 140 and spherical race 156 toward the left or compression side 160 in FIG. 3 to bottom at the wall 194, the secondary load path tie rod 140 will engage in compression. In the case where the primary load path failure urges the tie rod 140 and spherical race 156 toward the right or tension side 162 in FIG. 3 to bottom at the retainer 204, the secondary load path tie rod 140 will engage in tension. The secondary clevis assembly 146 reacts the compression loads directly via the wall 194 thereof and reacts the tension loads through the retainer 204 thereof. As noted above, the retainer 204 is adjustable by means of a threaded engagement 210 with the bore 170. In an embodiment, the threaded engagement 210 of the retainer 204 can be configured to enable micro adjustment relative to the bore 170 to allow for tight setting of the axial clearance gap A between the tie rod 140 and the secondary clevis assembly 146 at opposite ends of the cavity 158. The clearance gap A can ensure that no axial loading sharing occurs between the primary load path components and the secondary load path components when the primary load path is loaded with a tension or compression limit load.

Incorporated within the secondary clevis assembly 146 and the spherical race 156 is a detection system 130 that electronically detects secondary load path engagement of the actuator 100. With such an electronic detection system 130, there is no need for visual inspection at periodic intervals to determine if the primary load path has failed and the secondary load path has engaged. FIGS. 3 and 4 show details of an exemplary embodiment of the detection system 130. The as-shown detection system 130 includes a pair of sensors 222 mounted in the secondary clevis assembly 146 to detect axial displacement of the spherical race 156 relative to the secondary clevis assembly 146. In the figures, the sensors 222 are illustrated as proximity sensors 222, and for purposes of convenience the term proximity sensors 222 will be used hereafter. Proximity sensors 222 may have a high reliability and long functional life because of the absence of mechanical parts and lack of physical contact between the sensor 222 and the target. In addition, the proximity sensors 222 may be highly reliable due to their reduction in part count and their ruggedness in harsh environmental conditions. Of course, it will be appreciated that the sensors 222 need not be limited to proximity sensors 222, and can include any type of sensor suitable for sensing a relative displacement of the spherical race 156, including for example hall-effect, LVDT, ultrasonic, capacitive, inductive, among others.

The proximity sensors 222 of the detection system 130 are mounted in radially extending through holes 226 in the housing wall of the secondary clevis assembly 146. The housing of the secondary clevis assembly 146 is shaped and configured in relation to the aircraft structure 103 and upper support gimbal 126 to ensure that the proximity sensors 222 are located away from the upper support gimbal 126 and to achieve compact installation. As such, no interference will occur between the proximity sensors 222 and the support gimbal 126 during secondary load path engagement. The housing can be made out of stainless steel, for example, and the proximity sensors 222 can be coupled to the housing by a suitable connection such as by welding to seal the proximity sensors 222 from harsh environmental effects.

As shown in FIG. 4, the proximity sensors 222 extend radially inward such that their radially inward facing ends 224, or faces 224, are near the radius of the bore 170 of the secondary clevis assembly 146. The proximity sensors 222 can be designed to detect a metallic target of the spherical race 156 in close proximity to the face 224. Located radially opposite the proximity sensors 222 are a pair of respective voids or detents 232 in the outer diameter of the spherical race 156. The detents 232 are bordered at their axially opposite ends by portions of the spherical race 156 that are referred to herein as lands 244 and 246. The detents 232 are located generally axially in the middle of the spherical race 156 and are formed by axially opposing recesses 248 and 250 in the respective compression side race 164 and tension side race 166 of the spherical race 156. The first set of proximity sensors 222, detents 232 and lands 244, 246 (left side of FIG. 4) are angularly spaced apart from second set of proximity sensors 222, detents 232 and lands 244, 246 (right side of FIG. 4) by about 90 degrees. The proximity sensors 222, detents 232 and lands 244, 246 are angularly offset from the tabs 176 and key grooves 178.

Of course, the detection system 130 need not be limited to the illustrated configuration and other embodiments are contemplated. As will be appreciated, depending on for example the desired number of sensed targets and/or redundancy considerations and/or accessibility considerations, the quantity of proximity sensors 222 and corresponding detents 232 and lands 244, 246 can range from one to any suitable plurality; the angular spacing between different sets of proximity sensors 222, detents 226 and lands 244, 246 can be other than 90 degrees; and the quantity of proximity sensors 222 may be different than the quantity of detents 226 and lands 244, 246. In a further alternative configuration, the detents 232 can be omitted, and the spherical race 156 can include one or more lands at its outer diameter that slide within correspondingly positioned mating grooves in the bore 170 of the secondary clevis assembly 146.

The proximity sensors 222 are configured to detect the proximity or absence of the tie rod 140 position by way of sensed movement of the detents 232 and lands 244, 246 of the spherical race 156, and then annunciate a primary load path failure and transition to engagement in the secondary load path. The detection system 130 can thus provide immediate detection of tie rod 140 engagement. As the spherical race 156 moves with the spherical head 152 of the tie rod 140, the detents 232 and lands 244, 246 serve as the targets for the proximity sensors 222 to indicate the position of the tie rod 140. Each proximity sensor 222 can be configured to detect the status of the spherical race 156, for example, whether the spherical race 156 has moved toward the compression side 160 or tension side 162 of the secondary clevis assembly 146, by sensing the target detents 232 and lands 244, 246. Byway of example, when a target is 0.150 inch or more away from the face 224 of a proximity sensor 222, the proximity sensor 222 can indicate a FAR condition. This may occur, for example, when the spherical race 156 is in a position such that its detents 232 are radially opposite the proximity sensors 222. When a target is 0.100 inch or less away from the face 224 of a proximity sensor 222, the proximity sensor 222 can indicate a NEAR condition. This may occur, for example, when the spherical race 156 is in a position such that either of its lands 244, 246 are radially opposite the proximity sensors 222, or otherwise overlap with the proximity sensors 222.

Figure 5:
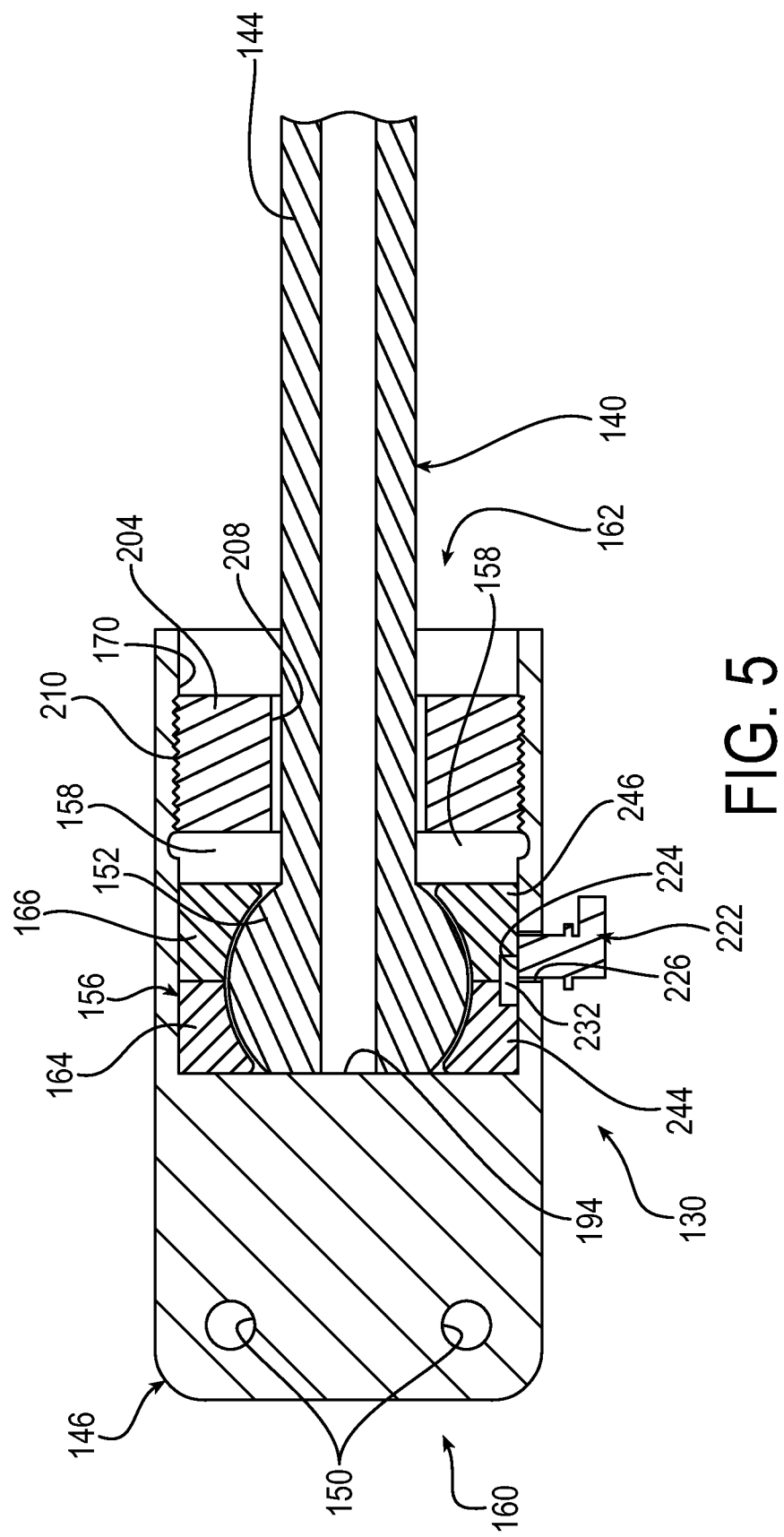
FIG. 5 is a partial elevational schematic view of the actuator as shown in FIG. 2, broken away in section, and shown with the fixed end of the actuator in a first type of failure state.
Figure 6:
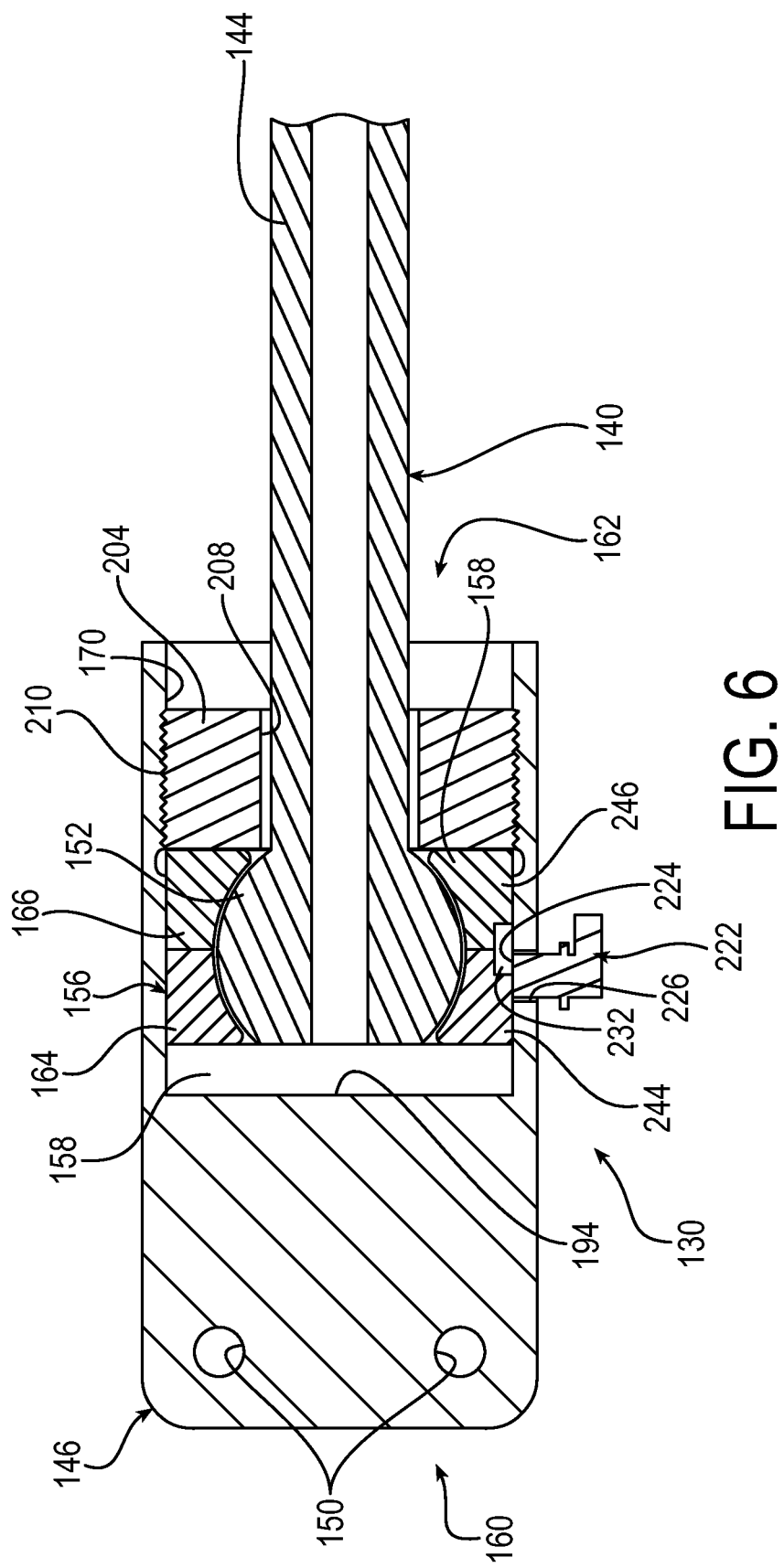
FIG. 6 is a partial elevational schematic view of the actuator as shown in FIG. 2, broken away in section, and shown with the fixed end of the actuator in another type of failure state.

Reference is now made to FIGS. 3, 5 and 6, which show different engagement states of the fixed end (the upper end in FIG. 2) of the flight control actuator 100 sensed by the detection system 130. FIG. 3 shows the fixed end of the flight control actuator 100 in a neutral state, for example, where the flight control actuator 100 is in primary load path engagement or ready for primary load path engagement, to transfer loads from the control surface 18 to the aircraft structure 103, and vice versa. FIGS. 5 and 6 show the fixed end of the flight control actuator 100 in two different failure states, where the tie rod 140 is in a compression engagement (FIG. 5) and where the tie rod 140 is in a tension engagement (FIG. 6).

In FIG. 3, the spherical race 156 is positioned in a neutral state such that its detents 232 are radially opposite the proximity sensors 222. The proximity sensors 222 thus detect a FAR condition, which in the illustrated embodiment indicates that the primary load path is intact; that is, loads between the control surface 18 and the aircraft structure 103 can pass through the primary portion of the drive gimbal 104, the primary ball nut assembly 108, the ball screw 106, the drive unit 120, and the support gimbal 126.

Referring now to FIG. 5, upon primary load path failure the secondary load path may engage in the compression load direction, for example, as by the tie rod 140 translating upward in FIG. 2, or the spherical head 152 of the tie rod 140 translating toward the compression side 160 of the secondary clevis assembly 146, until for example the spherical race 156 bottoms at the wall 194 of the secondary clevis assembly 146, thus compressively loading the tie rod 140. The compression load can be reacted through the tie rod 140, into the spherical race 156, and into the secondary clevis assembly 146. The spherical race 156 moves with the tie rod 140, causing displacement of the spherical race 156 and its lands 244 relative to the proximity sensors 222, such that the lands 244 are radially opposite the proximity sensors 222, here in overlapping relation with the faces 224 of the proximity sensors 222. The proximity sensors 222 thus detect a NEAR condition and annunciate the primary load path has failed and the secondary load path is engaged and loaded. The annunciation can include the proximity sensors 222 reporting a NEAR condition signal to the controller 101, for example.

The proximity sensors 222 are configured to detect a NEAR condition to indicate a primary load path failure and secondary load path engagement preferably before the spherical race 156 bottoms at the wall 194 of the secondary clevis assembly 146 in the compression load direction. In this way, electrical annunciation is achieved before the spherical race 156 mechanically bottoms at the wall 146. Once the spherical race 156 is bottomed, the proximity sensors 222 can continue to provide indication. In this regard, a threshold may be provided where, for example, the proximity sensors 222 indicate primary load path failure and secondary load path engagement slightly before the spherical race 156 is bottomed at the wall 146 and up until the spherical race 156 is bottomed and/or shortly after the spherical race 156 has bottomed. Of course, in other applications, the proximity sensors 222 may be configured to annunciate primary load path failure and transition to secondary load path engagement at other times, for example, at the same time that the spherical race 156 bottoms at the wall 146.

Referring to FIG. 6, upon primary load path failure the secondary load path may engage in the tension load direction, for example, as by the tie rod 140 translating downward in FIG. 2, or the spherical head 152 of the tie rod 140 translating toward the tension side 162 of the secondary clevis assembly 146, until for example the spherical race 156 bottoms at the retainer 204 of the secondary clevis assembly 146, thus tensilely loading the tie rod 140. The tension load can be reacted through the tie rod 140, into the spherical race 156, and into the secondary clevis assembly 146. The spherical race 156 moves with the tie rod 140, causing displacement of the spherical race 156 and its lands 246 relative to the proximity sensors 222, such that the lands 246 are radially opposite the proximity sensors 222, here in overlapping relation with the faces 224 of the proximity sensors 222. The proximity sensors 222 thus detect a NEAR condition and annunciate the primary load path has failed and the secondary load path is engaged and loaded. The annunciation can include the proximity sensors 222 reporting a NEAR condition signal to the controller 101, for example.

The proximity sensors 222 are configured to detect a NEAR condition to indicate a primary load path failure and secondary load path engagement preferably before the spherical race 156 bottoms at the retainer 204 of the secondary clevis assembly 146 in the tension load direction. In this way, electrical annunciation is achieved before the spherical race 156 mechanically bottoms at the retainer 204. Once the spherical race 156 is bottomed, the proximity sensors 222 can continue to provide indication. In this regard, a threshold may be provided where, for example, the proximity sensors 222 indicate primary load path failure and secondary load path engagement slightly before the spherical race 156 is bottomed at the retainer 204 and up until the spherical race 156 is bottomed and/or shortly after the spherical race 156 has bottomed. Of course, in other applications, the proximity sensors 222 may be configured to annunciate primary load path failure and transition to secondary load path engagement at other times, for example, at the same time that the spherical race 156 bottoms at the retainer 204.

The lands 244, 246 on axially opposite ends of the detents 232 of the detection system 130 allow for bi-directional monitoring, failure detection, and annunciation of tie rod 140 engagement in the compression load direction and tension load direction. Thus, the detection system 130 can detect primary load path failure and engagement of the tie rod 140 in the compression load direction by the proximity sensors 222 detecting the lands 246 moving into radially opposing or other overlapping relationship with the proximity sensors 222. This occurs as the spherical race 156 moves to the left from FIG. 3 to FIG. 5. Likewise, the detection system 130 can detect primary load path failure and engagement of the tie rod 140 in the tension load direction by the proximity sensors 222 detecting the lands 244 moving into radially opposing or other overlapping relationship with the proximity sensors 222. This occurs as the spherical race 156 moves to the right from FIG. 3 to FIG. 6. In the illustrated embodiment, a pair of angularly spaced proximity sensors 222 are used for the bi-directional monitoring, detection and annunciation. It will be appreciated that the detection system need not be limited as such, and a single proximity sensor 222 can enable bi-directional monitoring, failure detection, and annunciation of tie rod 140 engagement.

As will be appreciated, the proximity sensors 222 can be configured to monitor the movement of the spherical race 156 and thus the tie rod 140 by detecting a FAR condition and NEAR condition of the spherical race 156. In an embodiment, multiple axially aligned detents 232 and lands 244 may be provided in the outer diameter of the spherical race 156 to increase the number of detection points and corresponding axial movement changes in the spherical race 156 relative to the secondary clevis assembly 146. For example, upon the tie rod 140 and thus the spherical race 156 moving partially in the tension or compression direction, the spherical race 156 may locate a first land opposite the faces 224 of the proximity sensors 222, indicating a first NEAR condition annunciating that a primary load path failure and secondary load path engagement may be imminent. Then, upon the spherical race 156 bottoming in either tension or compression, the spherical race 156 will locate a different land opposite the faces 224 of the proximity sensors 222, indicating a second NEAR condition and annunciating that the primary load path has failed and the secondary load path is engaged and loaded.

Reference is made again to the fixed end (upper end) of the flight control actuator 100 in FIG. 2, where mounting bolts 148 pass through aligned mounting openings in the secondary clevis assembly 146 and the aircraft structure 103 to connect the two structures. An axial clearance is provided between the upper end of the secondary clevis assembly 146 and a base portion of the aircraft structure 103. With the mounting bolts 148 removed, this axial clearance allows the secondary clevis assembly 146 to be moved axially toward the base of the aircraft structure 103. A similar axial clearance is provided between the lower end of the secondary clevis assembly 146 and structure axially below it. With the mounting bolts 148 removed, this axial clearance allows the secondary clevis assembly 146 to be moved axially away from the base of the aircraft structure 103. As the secondary clevis assembly 146 is moved axially toward or axially away from the base of the aircraft structure 103, its mounting openings 150 move out of axial alignment with the corresponding mounting openings in the aircraft structure 103.

Referring to FIG. 3, with the primary load path intact it will be appreciated that axial movement of the secondary clevis assembly 146 toward the base of the aircraft structure 103 (to the left in FIG. 3) causes the secondary clevis assembly 146 to slide axially relative to the spherical race 210 until the retainer 210 is brought into contact with the tension side 162 of the spherical race 156. Similarly, axial movement of the secondary clevis assembly 146 away from the base of the aircraft structure 103 (to the right in FIG. 3) causes the secondary clevis assembly 146 to slide axially relative to the spherical race 210 until the wall 194 thereof is brought into contact with the compression side 160 of the spherical race 156.

The axial adjustability of the secondary clevis assembly 146 relative to the spherical race 156 when the mounting bolts 148 are removed and the primary load path is intact enables the secondary load path detection system 130 to be verified in service using a few simple steps. As such, maintenance can be performed periodically to determine, for example, whether the proximity sensors 222 are providing the correct output, and/or whether the proximity sensors 222 detect the detents 232 in the spherical race 156 to indicate that primary load path is intact.

The first step is to remove the two mounting bolts 148 that attach the secondary clevis assembly 146 to the upper aircraft structure 103. Here, the spherical race 156 is in a neutral position with respect to the secondary clevis assembly 146 in which the proximity sensors 222 are radially opposite the detents 232 in the spherical race 156. The next step is to push the secondary clevis assembly 146 in the upward direction toward the base of the aircraft structure 103 (to the left in FIG. 3). As the secondary clevis assembly 146 is pushed, the secondary clevis assembly 146 including the proximity sensors 222 slides relative to the spherical race 156 which is held axially in place by the tie rod 140, such that the proximity sensors 222 are radially opposite or otherwise overlapping with the lands 244 on the compression side 160 of the spherical race 156. The next step is to confirm that both proximity sensors 222 are detecting a NEAR condition with respect to such lands 244. As will be appreciated, a NEAR detection verifies correct output of the proximity sensors 222 wherein the secondary load path is engaged in the tension load direction. The next step is to pull the secondary clevis assembly 146 back to the neutral position, where the mounting openings 150 are aligned with the mounting holes in the aircraft structure 103 and the proximity sensors 222 are again radially opposite the detents 232 in the spherical race 156. The next step is to confirm that both proximity sensors 222 are detecting the FAR condition. As will be appreciated, a FAR detection verifies correct output of the proximity sensors 222 wherein the primary load path is intact and the secondary load path not engaged in either the tension load direction or the compression load direction. The next step is to pull the secondary clevis assembly 146 in the downward direction away from the base of the aircraft structure 103 (to the right in FIG. 3). As the secondary clevis assembly 146 is pulled, the secondary clevis assembly 146 including the proximity sensors 222 slides relative to the spherical race 156 which is held axially in place by the tie rod 140, such that the proximity sensors 222 are radially opposite or otherwise overlapping with the lands 246 on the tension side 162 of the spherical race 156. The next step is to confirm that both proximity sensors 222 are detecting a NEAR condition with respect to such lands 246. As will be appreciated, a NEAR detection verifies correct output of the proximity sensors 222 wherein the secondary load path is engaged in the compression load direction.

Thus, positive NEAR and FAR conditions verify that the secondary load path detection system 130 is operational. The next step is to re-align the mounting holes 150 of the secondary clevis assembly 146 with the corresponding mounting holes of the aircraft structure 130 and install the two mounting bolts 148. On the other hand, the failure of a detection of a NEAR and/or FAR condition verifies that the secondary load path detection system 130 is not operational and requires troubleshooting and/or repair.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A detection system for detecting failure in a primary load path of a flight control actuator and annunciating transition to engagement in a secondary load path of the flight control actuator, wherein failure in the primary load path causes axial movement in a secondary rod of the secondary load path, the detection system comprising:
   a secondary mounting assembly that guides axial movement of the secondary rod; and
   a sensor that electronically detects relative axial displacement between the secondary rod and the secondary mounting assembly upon a primary load path failure and annunciates transition to engagement in the secondary load path;
   a spherical joint that couples the secondary rod to the secondary mounting assembly to allow articulation of the secondary rod relative to the secondary mounting assembly;
   wherein the spherical joint includes a spherical race that is slidable axially with the secondary rod in an axially extending cavity defined by the secondary mounting assembly;
   a wall and a retainer at axially opposite ends of the cavity that restrict the amount of axial movement of the spherical race within the cavity;
   wherein the spherical race includes a compression indicating target, a neutral target, and a tensing indicating target that move with the spherical race and that are detectable by the sensor to indicate respective axial positions of the spherical race relative to the secondary mounting assembly.

2. The detection system of claim 1, wherein the sensor is a bi-directional sensor that upon a primary load path failure electronically detects either a tensile load in the secondary rod at a first axial end of the secondary mounting assembly or a compressive load in the secondary rod at a second end of the secondary mounting assembly, and annunciates transition to engagement in the secondary load path.

3. The detection system of claim 1, wherein the spherical race and the secondary mounting assembly are axially keyed to prevent rotation of the spherical race within the cavity of the secondary mounting assembly.

4. The detection system of claim 1, wherein upon primary load path failure, the secondary rod along with the secondary race translates axially until the spherical race bottoms on the wall to thereby engage the secondary rod in compression, and wherein the sensor detects the compression indicating target to annunciate that the primary load path has failed and transition to engagement in the secondary load path.

5. The detection system of claim 1, wherein upon primary load path failure, the secondary rod along with the secondary race translates axially until the spherical race bottoms on the retainer to thereby engage the secondary rod in tension, and wherein the sensor detects the tension indicating target to annunciate that the primary load path has failed and transition to engagement in the secondary load path.

6. The detection system of claim 1, wherein the spherical race includes one or more targets that move with the spherical race and that are detectable by the sensor to indicate respective axial positions of the spherical race relative to the secondary mounting assembly.

7. The detection system of claim 6, wherein the targets include a first target that the sensor detects as the spherical race being in a neutral position relative to the secondary mounting assembly to indicate that primary load path is intact.

8. The detection system of claim 1, wherein the retainer is axially adjustable to increase or decrease the axial span of the cavity to allow for respectively greater or less axial movement of the spherical race within the cavity.

9. The detection system of claim 1, wherein the sensor is configured to annunciate engagement in the secondary load path before the secondary rod is loaded in tension or compression.

10. A detection system for detecting failure in a primary load path of a light control actuator and annunciating transition to engagement in a secondary load path of the flight control actuator, wherein failure in the primary load path causes axial movement in a secondary rod of the secondary load path, the detection system comprising:
    a secondary mounting assembly that guides axial movement of the secondary rod; and
    a sensor that electronically detects relative axial displacement between the secondary rod and the secondary mounting assembly upon a primary load path failure and annunciates transition to engagement in the secondary load path;
    a spherical joint that couples the secondary rod to the secondary mounting assembly to allow articulation of the secondary rod relative to the secondary mounting assembly;
    wherein the spherical joint includes a spherical race that is slidable axially with the secondary rod in an axially extending cavity defined by the secondary mounting assembly;
    wherein the spherical race includes one or more targets that move with the spherical race and that are detectable by the sensor to indicate respective axial positions of the spherical race relative to the secondary mounting assembly;
    wherein the targets include second and third targets, the second target of which the sensor detects the spherical race as being displaced relative to the secondary mounting assembly in a second direction to annunciate the primary load path has failed and transition to engagement in the secondary load path, and the third target of which the sensor detects the spherical race as being displaced relative to the secondary mounting assembly in a third direction to annunciate the primary load path has failed and transition to engagement in the secondary load path, the third direction being opposite that of the second direction.

11. The detection system of claim 10, wherein the second target indicates a secondary load path engagement in which the secondary rod is loaded in compression and the third target indicates a secondary load path engagement in which the secondary rod is loaded in tension.

12. A flight control actuator, comprising:
a primary load path;
a secondary load path including a secondary rod, wherein failure in the primary load path causes axial movement in the secondary rod of the secondary load path; and
a detection system including:
    a secondary mounting assembly that guides axial movement of the secondary rod; and
a sensor that electronically detects relative axial displacement between the secondary rod and the secondary mounting assembly upon a primary load path failure and annunciates transition to engagement in the secondary load path;
    further comprising first, second, and third targets that move axially with axial movement of the secondary rod relative to the secondary mounting assembly and that are detectable by the sensor to indicate respective neutral, compressive, and tensile axial positions of the secondary rod.

13. The flight control actuator of claim 12, wherein the secondary mounting assembly is mounted to an aircraft structure by fasteners and wherein, when the primary load path is intact and the fasteners are removed, the secondary mounting assembly is slidable axially relative to the secondary rod.

14. The flight control actuator of claim 13, wherein when the secondary rod is in the neutral axial position the first target overlaps with the sensor to allow for verification of detection of the first target by the sensor.

15. The flight control actuator of claim 13, wherein the secondary mounting assembly is slidable axially relative to the secondary rod in a direction toward a base of the aircraft structure to overlap the second target with the sensor to allow for verification of detection of the second target by the sensor.

16. The flight control actuator of claim 13, wherein the secondary mounting assembly is slidable axially relative to the secondary rod in a direction away from a base of the aircraft structure to overlap the third target with the sensor to allow for verification of detection of the third target by the sensor.

* * * * *